(12) United States Patent
Sakuraba (10) Patent No.: US 8,599,429 B2
(45) Date of Patent: Dec. 3, 2013

(54) CONTROL PROGRAM AND IMAGE FORMING APPARATUS

(75) Inventor: Tamotsu Sakuraba, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 333 days.

(21) Appl. No.: 13/020,106

(22) Filed: Feb. 3, 2011

(65) Prior Publication Data

US 2011/0199648 A1     Aug. 18, 2011

(30) Foreign Application Priority Data

Feb. 12, 2010  (JP) ................................ 2010-028688

(51) Int. Cl.
*G06F 15/00* (2006.01)

(52) U.S. Cl.
USPC ........................................................ 358/1.18

(58) Field of Classification Search
USPC ....................................................... 358/1.18
See application file for complete search history.

(56) References Cited

U.S. PATENT DOCUMENTS

| 7,477,859 B2 | 1/2009 | Sakata et al. | |
| 2007/0229904 A1* | 10/2007 | Mori | ............................ 358/1.18 |

FOREIGN PATENT DOCUMENTS

| JP | 2005-329588 A | 12/2005 |
| JP | 2006-256019 A | 9/2006 |
| JP | 2007-272780 A | 10/2007 |
| JP | 2009-171033 A | 7/2009 |

OTHER PUBLICATIONS

Japanese Office Action dated Sep. 27, 2013 (and English translation thereof) in counterpart Japanese Application No. 2010-028688.

* cited by examiner

*Primary Examiner* — Saeid Ebrahimi Dehkordy (74) *Attorney, Agent, or Firm* — Holtz, Holtz, Goodman & Chick, PC (57) ABSTRACT

Disclosed is an image forming apparatus, which makes it possible to establish the register mark printing function easily and securely to print the register mark under the condition in conformity with the page arranging mode. The apparatus includes: a display section that displays a page-arranging function setting screen from which a page arranging mode is settable, and a register-mark printing function setting screen from which a kind and a printing condition of the register mark are settable; a storage section that stores a table in which the page arranging mode and the printing condition are correlated with each other; and a setting control section that specifies the printing condition of the register mark, corresponding to the current page arranging mode, while referring to the table stored in the storage section, to display the printing condition above-specified onto the register-mark printing function setting screen as a default printing condition.

12 Claims, 6 Drawing Sheets

| SEAMLESS BINDING MODE | BOOKLET MODE | DOUBLE SPEED MODE | 2 IN 1 INTEGRATION MODE | 2-REPEAT MODE | ROTATION 2-REPEAT MODE |
|---|---|---|---|---|---|
| 4 1 / 8 5 | 8 1 / 6 3 | 1 3 / 2 4 | 1 2 | 1 1 | 1 ↳ |

FIG. 3a

- 43: PAINT ADDITION AREA
- 42: CENTER REGISTER MARK
- 41: CORNER REGISTER MARK

| PAGE ARRANGING MODE | INITIAL SETTING OF AT PAGE ARRANGING SETTING TIME |
|---|---|
| PAGE ARRANGING OFF MODE | GRAY-OUT |
| SEAMLESS BINDING MODE | FOR EVERY SHEET |
| BOOKLET MODE | FOR EVERY SHEET |
| DOUBLE SPEED MODE | FOR EVERY PAGE |
| 2 IN 1 INTEGRATION MODE | FOR EVERY PAGE |
| 2-REPEAT MODE | FOR EVERY PAGE |
| ROTATION 2-REPEAT MODE | FOR EVERY PAGE |

GRAY-OUT DISPLAY MODE

FIG. 7c

DEFAULT DISPLAY MODE

FIG. 8

CONTROL PROGRAM AND IMAGE FORMING APPARATUS

This application is based on Japanese Patent Application NO. 2010-028688 filed on Feb. 12, 2010, with Japan Patent Office, the entire content of which is hereby incorporated by reference.

BACKGROUND OF THE INVENTION

The present invention relates to a control program and an image forming apparatus, and specifically relates to a control program to be executed in an apparatus for instructing an image forming apparatus, which is provided with a layout function and a register mark printing function, to implement an printing operation and an image forming apparatus that performs the printing operation according to instructions generated by the control program concerned.

In recent years, there has been proliferated such an image forming apparatus that is provided with a function for arranging a plurality of page images onto a single paper sheet (hereinafter, referred to as a page arranging function) and another function for printing register marks, which serve as reference lines for conducting a cutting operation, a folding operation and a stitch stopping operation, (hereinafter, referred to as a register mark printing function). The abovementioned functions are settable from the panel provided in the image forming apparatus concerned.

With respect to such the image forming apparatus that is provided with the page arranging function and the register mark printing function, for instance, Tokkai 2007-272780 (Japanese Patent Application Laid-Open Publication) has set forth such the print data generating apparatus that conduct the consecutive processes of: accepting the operations for determining and setting whether or not the positional controlling operation of the cutting marks in regard to images, represented by the document data to be printed, should be conducted; judging the kind of the page arrangement setting of the document data concerned; in response to the setting for conducting the positional controlling operation, determining the positions of the cutting marks on the paper sheet on which the images represented by the document data to be printed are arranged, based on the judged result; and in order to generate the print data according to the positions of the cutting marks, generating the depiction data representing the cutting marks concerned, so as to generate the print data from the document data concerned.

In this connection, as a mode of the page arranging operation, either a page arranging operation to be conducted on the premise that a bunch of paper sheets are folded, and then, bound (for instance, a seamless binding, a booklet binding, etc.), or another page arranging operation to be conducted on the premise that a paper sheet is not folded (for instance, a double speed, a 2in1 integration, a 2repeat, rotation 2repeat, etc.) can be cited.

In regard to the former case, since the page arranging operation is conducted on the premise that a bunch of paper sheets are folded, it is unnecessary to print the register marks onto both sides of each of the paper sheets. Further, if there exists a misregistration between the printing position of the register mark printed on the obverse side of the paper sheet concerned and that printed on the reverse side of the same paper sheet, the register mark shifted from the folded line becomes easily noticeable, the appearance of the printed product would be considerably deteriorated. Accordingly, in the former printing mode, it is preferable that the register mark is printed for every sheet (for every paper sheet).

On the other hand, in the latter case or in such the case that the page arranging function is not established, since the page arranging operation is conducted on the premise that a bunch of paper sheets are not folded, it is convenient to print the register marks onto each of the pages. Further, even if there exists a misregistration between the printing position of the register mark printed on the obverse side of the paper sheet concerned and that printed on the reverse side of the same paper sheet, the appearance of the printed product is hardly deteriorated. Accordingly, in the printing mode as abovementioned, it is preferable that the register mark is printed for every page.

However, in the conventional image forming apparatus, since the operation for setting the page arranging function and the other operation for setting the register mark printing function are not correlated with each other, the user should establish the printing condition of the register mark corresponding to the page arranging mode (whether the register mark is printed for every sheet or for every page). Accordingly, there has been such a problem that the operations for setting the register mark printing function are cumbersome for the user.

In addition to the above, according to the conventional configuration, since it is possible for the user to establish the setting conditions so as to print the register marks for every sheet, even when the user selects such the page arranging operation that is to be conducted on the premise that a paper sheet is not folded or when the user has not established the register mark printing function, there has been such another problem that it is impossible to prevent inappropriate settings.

SUMMARY OF THE INVENTION

To overcome the abovementioned drawbacks in conventional image forming apparatus, it is one of objects of the present invention to provide an image forming apparatus, which makes it possible to establish the register mark printing function easily and securely so as to print the register mark under the condition in conformity with the page arranging mode currently established, and a computer readable storage medium storing a computer executable program for implementing the print processing in the image forming apparatus concerned.

Accordingly, at least one of the objects of the present invention can be attained by any one of the image forming apparatuses and the computer readable storage medium storing a computer executable program to be implemented in the image forming apparatus concerned, described as follows.

(1) According to an image forming apparatus reflecting an aspect of the present invention, the image forming apparatus that is provided with a page arranging function for arranging a plurality of page images onto a single paper sheet and a register mark printing function for printing a register mark, which serves as a positional reference for applying a cut processing, a fold processing or a bind processing to the paper sheet, comprises: a display section that is adapted to display a page-arranging function setting screen from which a page arranging mode is settable, and a register-mark printing function setting screen from which a kind of the register mark and a printing condition of the register mark are settable; a storage section that is adapted to store a table in which the page arranging mode and the printing condition are correlated with each other; and a setting control section that is adapted to specify the printing condition of the register mark, which corresponds to the page arranging mode established by operating the page-arranging function setting screen, while referring to the table stored in the storage section, so as to display the printing condition above-specified onto the register-mark printing function setting screen as a default printing condition selected in advance.

(2) According to another aspect of the present invention, in the image forming apparatus recited in item 1, when the page arranging mode has not been established in the page-arranging function setting screen, the setting control section displays the register-mark printing function setting screen in such a state that an operation for selecting the printing condition of the register mark is disabled.

(3) According to still another aspect of the present invention, in the image forming apparatus recited in item 1, when the page arranging mode has been established in the page-arranging function setting screen, the setting control section implements a print processing based on the default printing condition selected in advance.

(4) According to still another aspect of the present invention, in the image forming apparatus recited in item 1, it is defined that the printing condition of the register mark is to print the register mark for every paper sheet or to print the register mark for every page.

(5) According to a computer readable storage medium reflecting yet another aspect of the present invention, the computer readable storage medium stores a computer executable program for implementing a print processing in an image forming apparatus that is provided with a page arranging function for arranging a plurality of page images onto a single paper sheet and a register mark printing function for printing a register mark, which serves as a positional reference for applying a cut processing, a fold processing or a bind processing to the paper sheet, the program being executable by a computer to cause the computer to perform a process comprising: displaying a page-arranging function setting screen from which a page arranging mode is settable, and a register-mark printing function setting screen from which a kind of the register mark and a printing condition of the register mark are settable; storing a table in which the page arranging mode and the printing condition are correlated with each other; and specifying the printing condition of the register mark, which corresponds to the page arranging mode established by operating the page-arranging function setting screen, while referring to the table, so as to display the printing condition above-specified onto the register-mark printing function setting screen as a default printing condition selected in advance.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3a shows a schematic diagram indicating an example of a print product, while FIG. 3b, FIG. 3c and FIG. 3d show schematic diagrams indicating various kinds of corner register marks to be printed in the print product shown in FIG. 3a;

DETAILED DESCRIPTION OF THE PREFERRED EMBODIMENT

As described in the "BACKGROUND OF THE INVENTION", some image forming apparatuses among the recently developed image forming apparatuses are provided with the page arranging function and the register mark printing function, which are individually settable therein. However, since some relatively related aspects exist between the page arranging function and the register mark printing function, the appearance of the final print product would be deteriorated unless the register marks are printed under such conditions that are suitable for the page arrangement mode, which is currently employed. Therefore, there have been such the problems that the operations for setting the register mark printing function become cumbersome for the user and inappropriate settings cannot be prevented in advance.

To overcome the abovementioned problem in the conventional image forming apparatus, according to the printing system embodied in the present invention, an image forming apparatus that is provided with the page arranging function and the register mark printing function, or a client terminal device (printer driver) that instructs the image forming apparatus concerned, conducts consecutive processes of: referring to a table in which the page arranging function and the register mark printing function are correlated with each other, when displaying the setting screen of the register mark printing function, in order to specify the register mark printing condition corresponding to the page arranging mode currently established; displaying the specified printing condition as the default selection state; displaying the register mark printing condition in a selection disabled mode, when the page arranging mode has not been established; automatically setting the register mark printing function so that the register marks are printed under the specified condition, when the page arranging mode has been established; etc.

According to the abovementioned features of the present invention, it becomes unnecessary for the user to select by himself the register mark printing condition corresponding to the page arranging mode currently established, it becomes possible not only to make the setting operation of the register mark printing function easy, but also to prevent such a user's mistake that the user has selected an inappropriate register mark printing condition.

Embodiment

Figure 1:
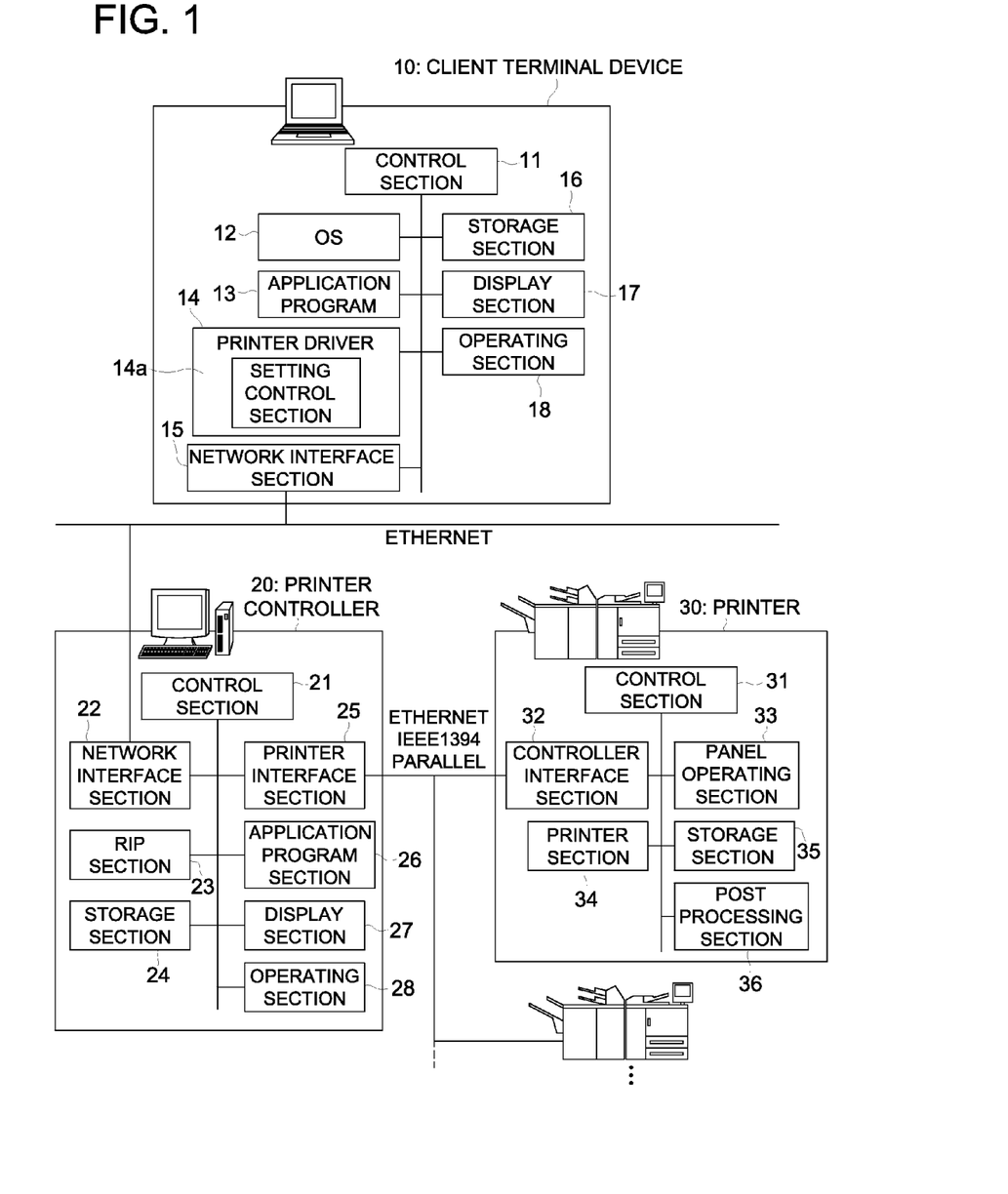
FIG. 1 shows a block diagram indicating a configuration of a printing system embodied in the present invention.
Figure 2:
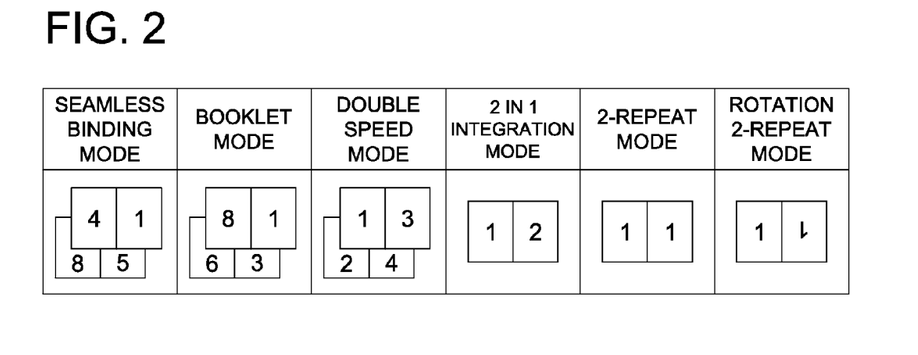
FIG. 2 shows a schematic diagram indicating various kinds of page arrangement modes.
Figure 3A:
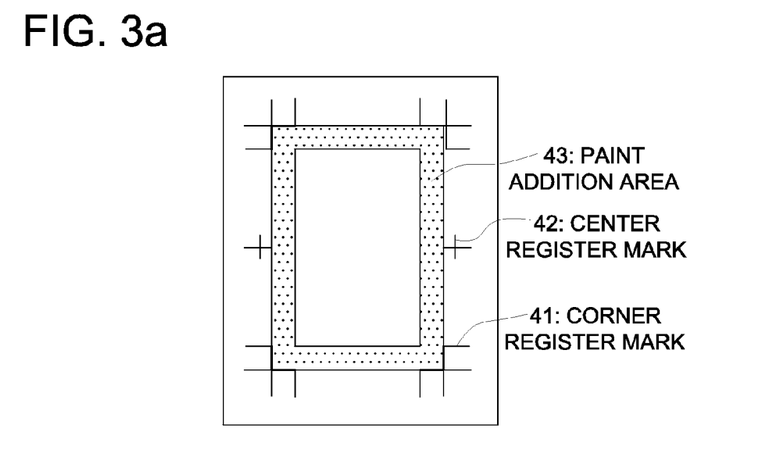
Figure 3B:
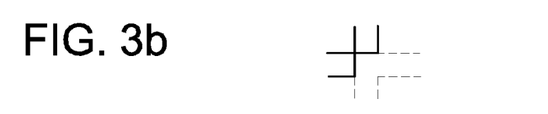
Figure 3C:
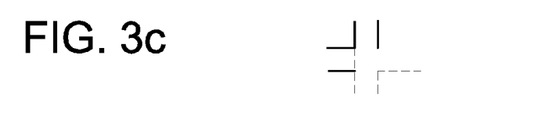
Figure 3D:
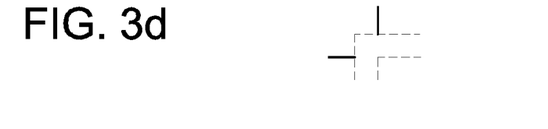
Figure 4:
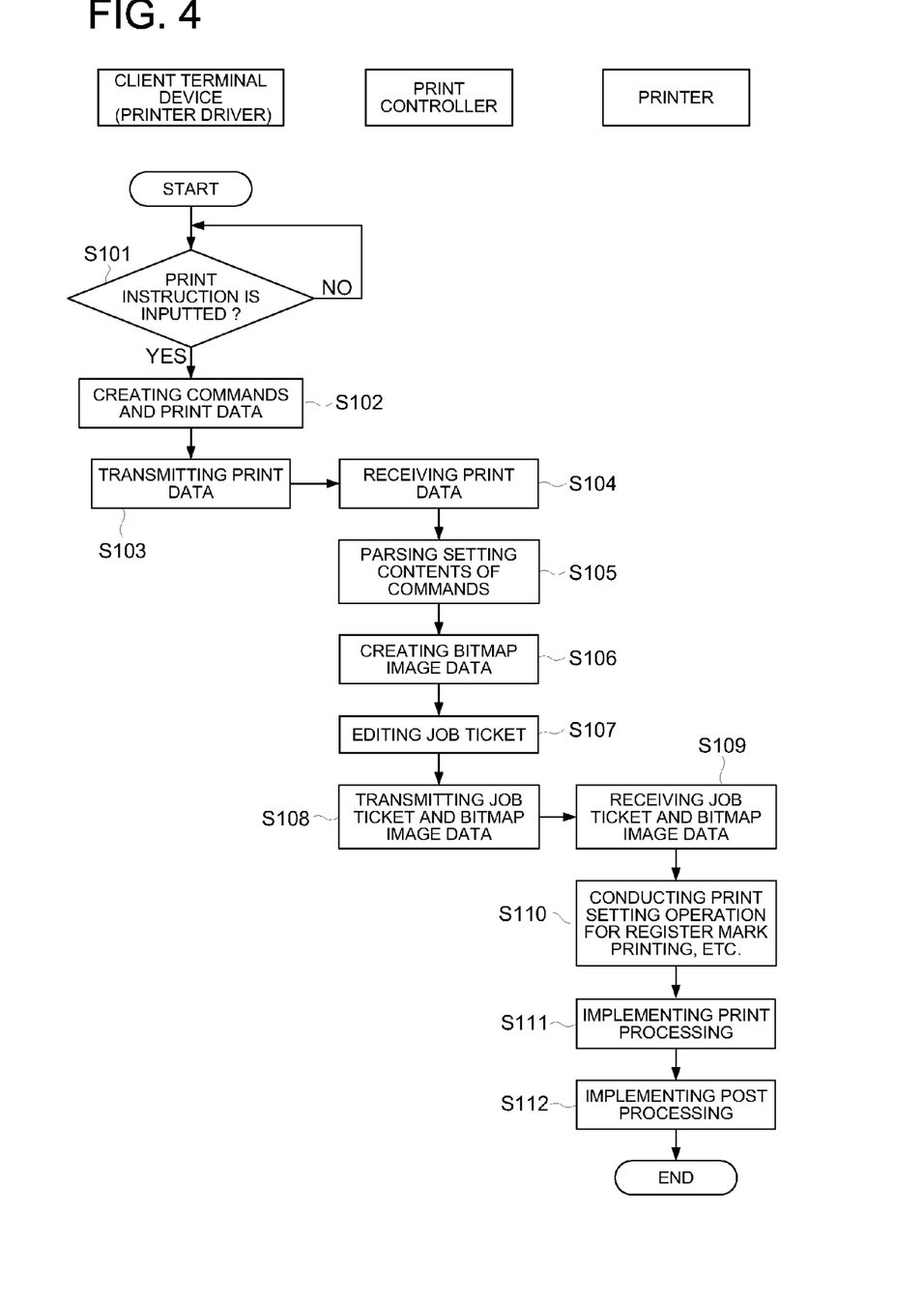
FIG. 4 shows a flowchart indicating an overall flow of operations to be conducted in a printing system embodied in the present invention.
Figure 5:
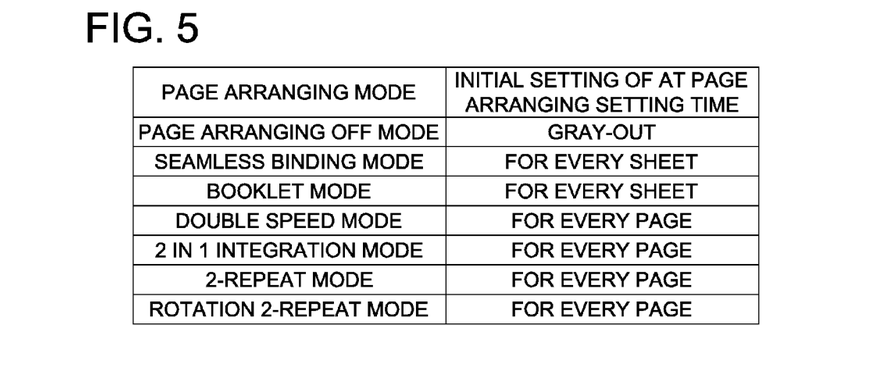
FIG. 5 shows an exemplary table specifying relationships between a page arranging function and a register mark printing function.

In order to further describe the abovementioned embodiment of present invention in detail, referring to FIGS. 1 through 8, a control program and an image forming apparatus, both embodied in the present invention, will be detailed in the following. FIG. 1 shows a block diagram indicating a printing system embodied in the present invention, FIG. 2 shows a schematic diagram indicating various kinds of page arrangement modes, and FIG. 3a shows a schematic diagram indicating an example of a print product, while FIG. 3b, FIG. 3c and FIG. 3b show schematic diagrams indicating various kinds of corner register marks to be printed in the print product shown in FIG. 3a. Further, FIG. 4 shows a flowchart indicating an overall flow of operations to be conducted in the printing system embodied in the present invention, and FIG. 5 shows an exemplary table indicating relationships between the page arranging function and the register mark printing function. Still further, FIG. 6a, FIG. 6b, FIG. 7a, FIG. 7b and FIG. 7c show schematic diagrams indicating exemplary screens to be displayed on the client terminal device, and FIG. 8 shows a flowchart indicating operations to be conducted by the printer driver.

As shown in FIG. 1, the printing system, embodied in the present invention, includes a client terminal device 10, a printer controller 20 and a printer 30, which are capable of being coupled to each other through a communication network and are arranged on the intranet. In this connection, although the Ethernet (Registered Trade Mark) or the like can be employed as the standard of the communication network, it is possible to employ the other communication standard, such as the IEEE1394, the Parallel, etc., for the data transmission from the printer controller 20 to the printer 30, other than the Ethernet (Registered Trade Mark). Further, although the printer controller 20 and the printer 30 are separately installed in the system, it is also applicable that the printer controller 20 includes the printer 30 therein. Each of the client terminal device 10, the printer controller 20 and the printer 30 will be detailed in the following.

<Client Terminal Device>

The client terminal device 10 is configured as a kind of computer apparatus, such as a personal computer, etc., and is provided with a control section 11, an OS (Operating System) 12, an application program 13, a printer driver 14, a network interface section 15, a storage section 16, a display section 17, an operating section 18, etc.

The control section 11 is constituted by a CPU (Central Processing Unit) and storage devices, such as ROM (Read Only Memory), RAM (Random Access Memory), etc., so as to control the overall operations of the client terminal device 10. The OS 12 is the Windows (Registered Trade Mark), the Macintosh (Registered Trade Mark), etc., to make the application program 13 executable in the client terminal device 10. The application program 13 is a kind of software for creating a document, etc. The printer driver 14 converts the document, created by executing the application program 13, to the PDL (Page Description Language) being readable by the printer controller 20, such as the PCL (Printer Control Language), the PostScript, etc. The network interface section 15 is constituted by an NIC (Network Interface Card), etc., to connect the client terminal device 10 to the communication network concerned. The storage section 16 is constituted by various kinds of memories, an HDD (Hard Disc Drive), etc., to store the table, detailed later, in which the page arranging function and the register mark printing function are correlated with each other, etc., therein. The display section 17 is constituted by an LCD (Liquid Crystal Display), etc., to display various kinds of screens including a setting screen of the page arranging function and another setting screen of the register mark printing function, both detailed later, etc., thereon. The operating section 18 is constituted by a mouse, a keyboard, etc., so as to make it possible to input setting operations to be conducted on the setting screens above-mentioned.

Further, the printer driver 14 also serves as a setting control section 14a that conducts the consecutive processes of: acquiring the abovementioned table from the storage section 16 (or another section), when the display section 17 is made to display the setting screen of the register mark printing function thereon; referring to the table above-acquired, in order to specify the register mark printing condition corresponding to the page arranging mode currently established; displaying the specified printing condition as the default selection state; displaying the register mark printing condition in the selection disabled mode, when the page arranging mode has not been established; automatically setting the register mark printing function so that the register marks are printed under the specified condition, when the page arranging mode has been established; etc.

For instance as shown in FIG. 2, cited as the abovementioned page arranging function includes: the "seamless binding mode" in which each of duplex printed paper sheets is folded two, and then, the two-folded paper sheets are sequentially piled one after another so as to bind them into one; the "booklet mode" in which a plurality of duplex printed paper sheets is folded two in such a state that the duplex printed paper sheets are piled up, so as to bind them into the booklet; the "double speed mode" in which a plurality of paper sheets is cut into two bunches in such a state that the paper sheets overlap with each other, so as to pile up the two bunches into one; the "2 in1 integration mode" in which two page images are allotted to each one of the paper sheets; the "2repeat mode" in which page images are allotted to each of the paper sheets in the same direction; the "rotation 2repeat mode" in which page images are allotted to each of the paper sheets while rotating the each of the page images in a reverse direction; etc.

Further, as shown in FIG. 3a, the register marks to be printed by the register mark printing function include: "corner register marks 41", which are disposed at the four corners of the page image concerned; "center register marks 42", which are disposed at the center positions located near the side lines of the page image concerned, etc. Further, it is also possible to print a solid color or a certain pattern onto a paint addition area 43, which is surrounded by the "corner register marks 41". In this connection, the shape of the register mark can be set at an arbitral shape. For instance, the shapes of the "corner register marks 41" may be set at such shapes that are indicated in FIG. 3b, FIG. 3c and FIG. 3d.

<Printer Controller>

The printer controller 20 controls the printer 30 according to the instructions sent from the client terminal device 10, and is provided with a controlling section 21, a network interface section 22, a RIP (Raster Image Processor) section 23, a storage section 24, a printer interface section 25 and an application program section 26, and also provided with a display section 27, an operating section 28, etc., as needed.

The controlling section 21 is constituted by a CPU (Central Processing Unit) and various kinds of memories, such as a ROM (Read Only Memory), a RAM (Random Access Memory), etc., so as to control the overall operations of the printer controller 20. The network interface section 22 is constituted by a NIC (Network Interface Card), etc., to connect the printer controller 20 to the communication network. The RIP section 23 translates the print data described in the Page Description Language and rasterizes the each page of the translated print data so as to create bitmap data for every page, and then, applies various kinds of image processing, such as a color adjustment processing, a density adjustment processing, a slide processing, a size-reduction processing, etc., and a screening operation to the bitmap data as needed. The storage section 24 is constituted by various kinds of memories and an HDD (Hard Disc Drive), etc., to store the print data, the bitmap data, etc., therein. The printer interface section 25 makes it possible to communicate with the printer 30, so as to conduct the operation for transmitting the bitmap image data, etc. The application program section 26 edits the bitmap image data created by the RIP section 23 and a job ticket for conducting the post processing, and conducts data controlling operations for implementing the printing. The display section 27 is constituted by an LCD (Liquid Crystal Display), etc., so as to display various kinds of setting screens thereon. The operating section 28 is constituted by a mouse, a keyboard, etc., so as to make it possible to input various kinds of setting operations therefrom.

<Printer>

The printer 30 serves as an image forming apparatus that implements the printing operation according to the instructions issued by the printer controller 20, such as an MFP (Multi Function Peripheral), etc., and is provided with a control section 31, a controller interface section 32, a panel operating section 33, a printer section 34, a storage section 35, a post processing section 36, etc.

The control section 31 is constituted by a CPU (Central Processing Unit) and various kinds of memories, such as a ROM (Read Only Memory), a RAM (Random Access Memory), etc., so as to control the overall operations of the printer 30. The controller interface section 32 is constituted by a NIC (Network Interface Card), etc., to connect the printer controller 20 to the communication network The panel operating section 33 is structured by mounting a pressure sensitive operating section (touch panel), in which transparent electrodes are arranged in a lattice pattern, onto the display section, so as to make it possible to perform the various kinds of operations of the printer 30, the setting operations of the page arranging function and the register mark printing function, etc. The printer section 34 actually implements the printing operation according to the printing instruction. Concretely speaking, the printer section 34, serving as a printer that employs, for instance, the electro-photographic image forming process, implements the processes of: irradiating a light modulated by the image data onto the photoreceptor drum, the circumferential surface of which is uniformly charged, so as to create an electrostatic latent image thereon; making electrically charged toner particles adhere onto the electrostatic latent image so as to form a visual toner image on the circumferential surface of the photoreceptor drum; transferring the visual toner image onto the paper sheet through a primary transferring roller, an intermediate transfer member, such as a secondary transfer belt, etc.; and then, applying heat and pressure onto the toner image formed on the paper sheet so as to fix the toner image thereon. The storage section 35 is constituted by various kinds of memories and an HDD (Hard Disc Drive), etc., to store the table in which the page arranging function is correlated with the register mark printing function, etc., therein. The post processing section 36 implements various kinds of post processing, such as cutting the printed paper sheet at the position indicated by the register marks, folding the paper sheet two or more, stapling a plurality of printed paper sheets, etc.

In this connection, although the function of the setting control section 14a is equipped into the printer driver 14 of the client terminal device 10 in the abovementioned embodiment of the present invention, it is also applicable that a controlling program, which makes the control section 11 serve as the setting control section 14a, is installed separately from the printer driver 14, or the setting control section 14a is configured as hardware. Further, it is also applicable that, when the setting operations of the page arranging function and the register mark printing function are conducted in the printer controller 20 or the printer 30, the functions of the setting control section 14a are provided in any one of the control sections of them.

Further, although the system, exemplified in the present embodiment, is so constituted that the printer 30 is provided with the post processing section 36, it is also applicable that the post processing is implemented in any other apparatus or by user himself.

Next, referring to the flowchart shown in FIG. 4, a typical printing process to be conducted in the printing system, which is provided with the client terminal device, the printer driver and the printer, will be detailed in the following.

Initially, the user creates a document to be printed, by using the application program 13 installed in advance in the client terminal device 10. When the user inputs a print instruction through the application program 13 (Step S101; Yes), the printer driver 14 displays the setting screen for instructing the page arrangement processing, the register mark print processing and the post processing inherent to the printer 30. Successively, when the user establishes the printing conditions from the abovementioned setting screen, the printer driver 14 creates commands that specify the printing conditions, and at the same time, converts the document data, written in the format specified in the application program above-employed, to print data written in another format, which makes its print-outputting operation possible, so as to create the print data (Step S102). Then, the printer driver 14 transmits the print data attached with the above-created commands to the printer controller 20 (Step S103).

Successively, the printer controller 20 receives the print data (Step S104), and the RIP section 23 parses the setting contents of the commands (Step S105) to rasterize each page of the print data so as to create the bitmap image data (Step S106). Then, the application program section 26 edits the job ticket for conducting the edit processing and the post processing of the bitmap image data (Step S107), and then, transmits the job ticket and the bitmap image data to the printer 30 (Step S108).

Still successively, receiving the job ticket and the bitmap image data sent from the application program section 26 (Step S109), the printer 30 conducts the print setting operation according to the job ticket (Step S110), so as to implement the print processing (Step S111). On that occasion, if the implementation of the page arrangement processing and/or the register mark print processing are/is also instructed, the printer 30 implements the page arranging operation and/or prints the register marks according to the conditions currently established. Further, if the implementation of the post processing is also instructed, the printer 30 implements the post processing according to the conditions currently established (Step S112).

In this connection, according to the conventional printing system, since the operation for setting the page arranging function and the other operation for setting the register mark printing function are independent of each other, the setting screen of the register mark printing function is independently displayed in the same way, irrespective of the setting contents of the page arranging function. Accordingly, the user is obliged to select the printing conditions of the register mark printing function by himself, so as to make it comply with the page arranging mode currently established, and therefore, the setting operations have been complicated and cumbersome for the user, and sometimes, the user has erroneously established inappropriate settings.

To overcome the abovementioned drawback of the conventional printing system, the embodiment of the present invention makes it possible to establish the settings of both the page arranging function and the register mark printing function from the client terminal device 10 (printer driver), and stores the table in which the page arranging modes of the page arranging function are respectively correlated with the register mark printing conditions of the register mark printing function, as shown in FIG. 5, into the storage section 16 of the client terminal device 10 (or the storage section 35 of the printer 30), etc., so that, referring to the table concerned, the printer driver 14 specifies the register mark printing condition corresponding to the page arranging mode currently established, displays the specified printing condition as the default selection state and automatically establishes the printing conditions concerned when displaying the setting screen of the register mark printing function, in order to make the setting operations to be conducted by the user easier than ever. Further, when the page arranging mode has not been established, the printer driver 14 displays the register mark printing condition in the selection disabled mode, so as to prevent the user from establishing inappropriate settings in advance.

The operations to be conducted by the printer driver 14 will be detailed in the following.

Figure 6A:
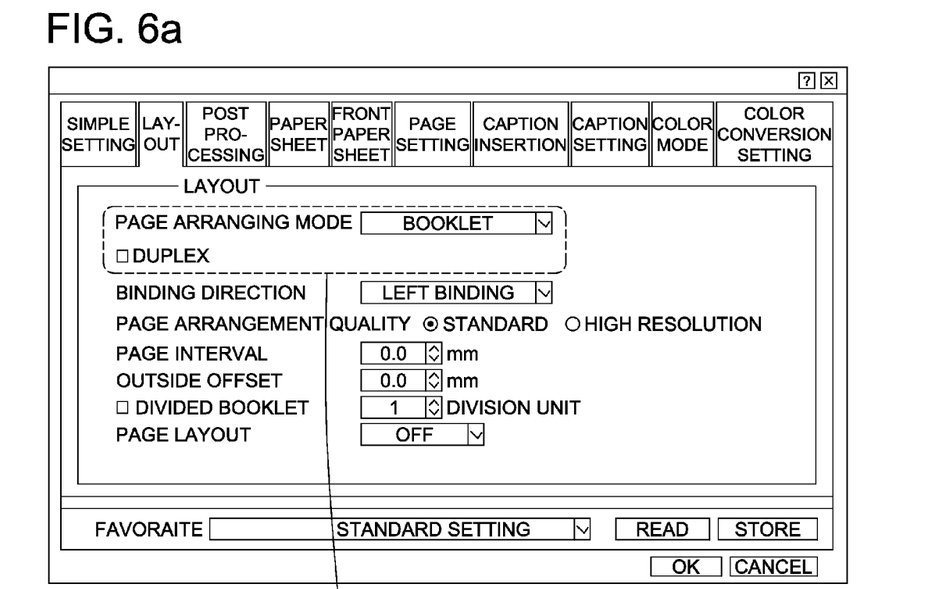
FIG. 6a and FIG. 6b show schematic diagrams indicating exemplary screens (page arrangement setting screen) to be displayed on a client terminal device.
Figure 6B:
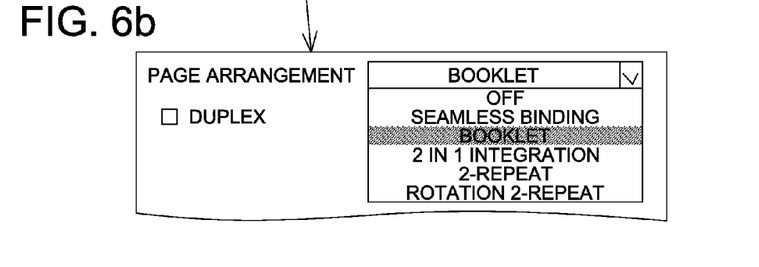

Initially, referring to the exemplified screens shown in FIG. 6 and FIG. 7, such the case that the printer driver 14 only conducts the operation for setting the register mark printing function without conducting the operation for setting the page arranging function, will be detailed in the following.

The printer driver 14 executes the application program 13 to open the print setting dialogue so as to activate the printer driver screen by using the property/detail-setting etc. In the printer driver screen, various kinds of setting items are displayed as a plurality of categorized groups, and when the user selects an item of the register mark printing, a register mark print setting screen 51 as shown in FIG. 7a is displayed.

The register mark print setting screen 51 is provided with various kinds of columns, such as a column for selecting a kind of register mark, another column for selecting a register mark printing condition indicating whether the register mark should be printed for every page or for every sheet, etc., so that the user can select any one of a corner register mark, a center register mark and a corner/center register mark (herein, corner register mark is selected), when the user establishes the page arranging function. Further, in this example, since the page arranging function is not established, the printer driver 14 still displays the "ESTABLISHMENT AT PAGE ARRANGING TIME" in the gray-out displaying mode as shown in FIG. 7b, so as to makes the user's selection disabled. According to this feature, it becomes possible to prevent the user in advance from establishing such inappropriate settings that the register mark should be printed for every sheet, despite that the page arranging function is not established.

Successively, finalizing the functional setting operations, the user depresses the OK button. Then, detecting the depression of the OK button, the printer driver 14 closes the dialogue and transmits the print data to printer 30. At that occasion, the printer driver 14 describes the following settings onto the command data to be added to the print data concerned.

| ... | |
|---|---|
| TRAY=AUTO | %% PAPER SHEET FEEDING: AUTOMATIC |
| CUTMATK=CORNER | %% REGISTER MARK: CORNER |
| IMPOSITION=OFF | %% PAGE ARRANGING: OFF |
| PAPER=A4 | %% PAPER SHEET: A4 |
| ... | |

Still successively, receiving the print data concerned, the printer controller 20 parses the command data abovementioned. When the register mark printing function is established, the printer controller 20 determines the kind of the register mark (in the abovementioned example, corner register mark). Still successively, the printer controller 20 implements the rasterize processing so as to create the bitmap image data from the print data concerned, and transmit the bitmap image data in order of pages and the setting information in regard to the register mark printing operations, to the printer 30.

Yet successively, receiving the bitmap image data and the register mark printing information, the printer 30 implements the printing operation based on the bitmap image data, and at the same time, prints the register marks onto the four corners of the printed image, so as to output the paper sheet on which both the concerned image and the register marks are printed.

Next, referring to the exemplified screens shown in FIGS. 6 and 7, and the flowchart shown in FIG. 8, the operations for establishing the page arranging function and the register mark printing function, to be conducted by the printer driver 14, will be detailed in the following.

The printer driver 14 executes the application program 13 to open the print setting dialogue, and activates the printer driver screen by the property/detail setting, etc. When the user selects the page arranging function from the abovementioned printer driver screen, a page arrangement setting screen 50, as shown in FIG. 6a, is displayed.

The page arrangement setting screen 50 is provided with a column for selecting the page arranging mode, another column for selecting whether or not the duplex printing should be implemented, etc., so that the user can select not only any one of an OFF mode, a seamless binding mode, a booklet mode, a 2in1 integration mode, a 2-repeat mode and a rotation 2-repeat mode, which are indicated in pull-down menu, (in this example, booklet mode is selected), but also whether or not the duplex printing should be implemented. When the user depresses the OK button after completing the above-selecting operations, the printer driver 14 accepts the settings of the page arranging function established by the user.

Figure 7A:
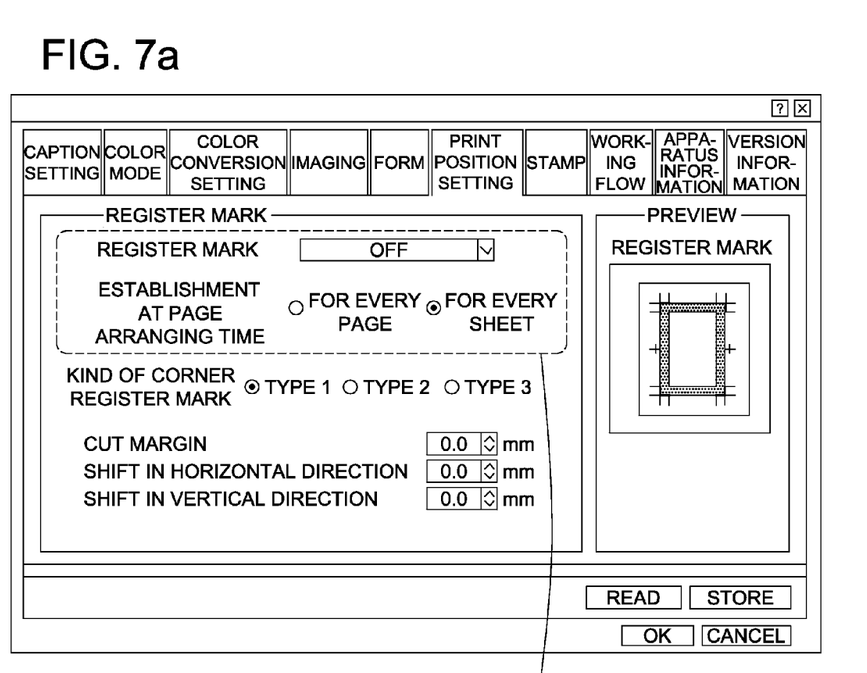
FIG. 7a, FIG. 7b and FIG. 7c show schematic diagrams indicating exemplary screens (register mark setting screen) to be displayed on a client terminal device.
Figure 7B:
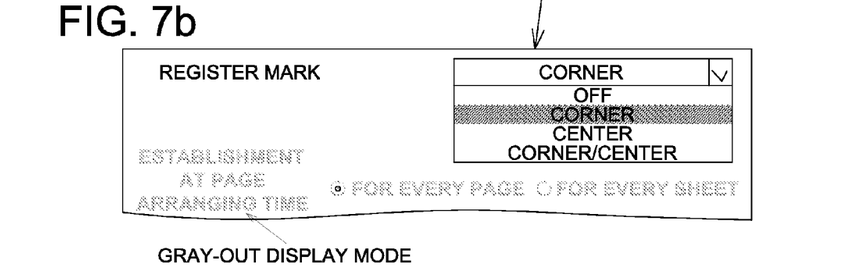
Figure 7C:
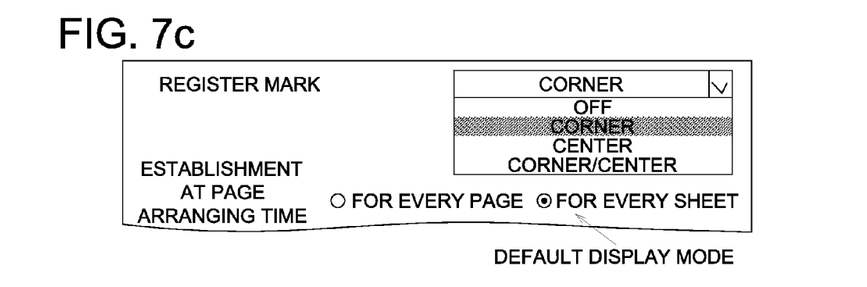
Figure 8:
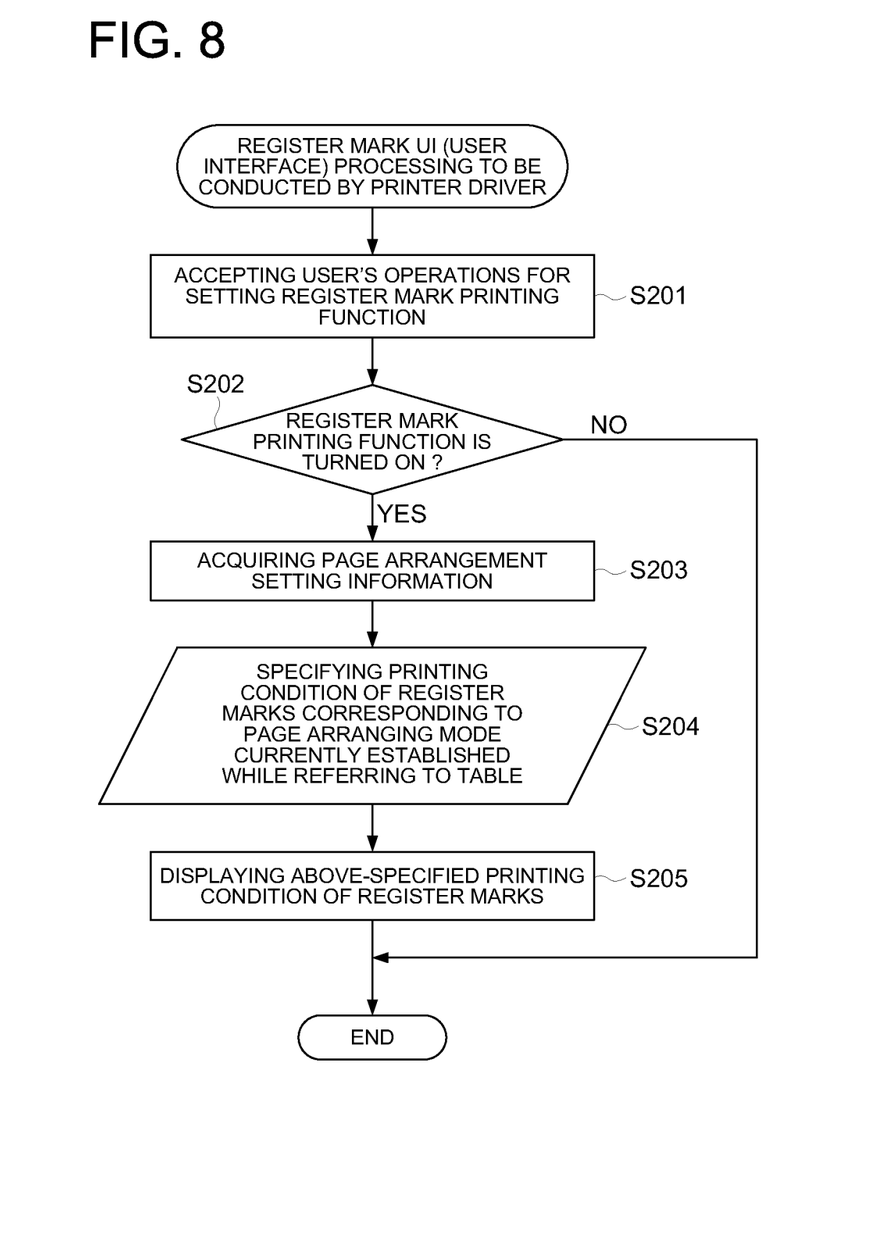
FIG. 8 shows a flowchart indicating operations to be conducted by a printer driver embodied in the present invention.

Successively, when the user selects the register mark printing function from the printer driver screen, the printer driver 14 displays the register mark print setting screen 51, as shown in FIG. 7a, so as to accept the user's operations for setting the register mark printing function (Step S201). When the user selects any one of a corner register mark, a center register mark and a corner/center register mark (herein, corner register mark is selected) from the register mark kind selection column (Step S202; Yes), the printer driver 14 acquires the page arrangement setting information (Step S203), and then, releases the gray-out displaying mode currently applied to the "ESTABLISHMENT AT PAGE ARRANGING TIME" as shown in FIG. 7c. Still successively, referring to the table shown in FIG. 5, the printer driver 14 specifies the printing condition of the register marks (herein, for every sheet) corresponding to the page arranging mode currently established (herein, a booklet printing mode) (Step S204), and then, displays the above-specified condition in the state that "for every sheet" is selected as its initial setting (Step S205). As described in the above, when the page arranging mode is established, by displaying the printing condition of the register marks, which corresponds to the page arranging mode concerned, as its default condition, it becomes possible not only for the user to easily conduct the operations for setting the register mark printing function, but also to prevent the user from establishing inappropriate settings in advance.

Successively, finalizing the functional setting operations, the user depresses the OK button. Then, detecting the depression of the OK button, the printer driver 14 closes the dialogue and transmits the print data to printer 30. At that occasion, the printer driver 14 describes the following settings onto the command data to be added to the print data concerned. In this connection, in such the case that it is disabled to change the printing condition of the register marks from the initial setting, since the printing condition of the register marks is automatically established when the page arranging mode has been established, it becomes possible to make the operation for setting the register mark printing function easier than ever.

```
...
TRAY=AUTO              %% PAPER SHEET FEEDING:
                         AUTOMATIC
CUTMATK=CORNER         %% REGISTER MARK: CORNER
SETFORIMPOSE=SHEET     %% ESTABLISHMENT AT PAGE
                         ARRANGING TIME: FOR EVERY SHEET
IMPOSITION=OFF         %% PAGE ARRANGING: BOOKLET
PAPER=A4               %% PAPER SHEET: A4
...
```

Still successively, receiving the print data concerned, the printer controller 20 parses the command data abovementioned. When the register mark printing function is established, the printer controller 20 determines the kind of the register mark (in the abovementioned example, corner register mark). Still successively, the printer controller 20 implements the rasterize processing so as to create the bitmap image data from the print data concerned, and transmit the bitmap image data in order of pages and the setting information in regard to the register mark printing operations, to the printer 30.

Yet successively, receiving the bitmap image data and the register mark printing information, the printer 30 implements the printing operation based on the bitmap image data, and at the same time, prints the register marks onto the four corners of the printed image for ever sheet, so as to output the paper sheet on which both the concerned image and the register marks are printed.

As described in the foregoing, according to the present embodiment, when displaying the register mark print setting screen 51, the printer driver 14 of the client terminal device 10 displays the register mark print setting screen 51 in such a manner that it is disable to select the printing condition of the register marks when the page arranging mode is not established, while the printer driver 14 displays the printing condition of the register marks, which corresponds to the page arranging mode currently established, as its default condition when the page arranging mode is established, and then, automatically describes the printing condition of the register marks onto the command data. Therefore, it becomes possible for the user to easily and securely conduct the operations for setting the register mark printing function.

In this connection, although the default display in the "ESTABLISHMENT AT PAGE ARRANGING TIME" is changed corresponding to the page arranging mode in the present embodiment, it is also applicable that the system is so constituted that the kinds of the register marks (corner register mark, center register mark and corner/center register mark) are described in the Table shown in FIG. 5 in advance, so as to also change the default display in the register mark selecting column of the register mark print setting screen 51.

Further, although the printer driver 14 of the client terminal device 10 controls the operation for displaying the register mark print setting screen 51 in the present embodiment, it is also applicable that the system is so constituted that any one or any combination of the application program 13, the control section 31 of printer 30, etc., conducts the controlling operation same as the above.

Still further, although the page arranging function and the register mark printing function are correlated with each other in the present embodiment aforementioned, the scope of the present invention is not limited to the aforementioned embodiment. In the same way as described in the foregoing, the present invention could be also applied to such a case that operations for displaying a setting screen with respect to a plurality of arbitral functions, which are related to each other, should be controlled.

The present invention is available for an image forming system, which includes an image forming apparatus that is provided with the page arranging function and the register mark printing function.

According to any one of the image forming apparatus embodied in the present invention and the computer readable storage medium, embodied in the present invention, which stores a computer executable program for implementing the print processing in the image forming apparatus concerned, it becomes possible to establish the register mark printing function easily and securely so as to print the register mark under the condition in conformity with the page arranging mode currently established.

This is because, when the register mark printing function setting screen is displayed on the client terminal device for instructing the printing operation and an apparatus (image forming apparatus) that implements the printing operation concerned, the printing condition of the register mark, corresponding to the page arranging mode currently established, is specified by referring to the table established in advance, and then, the specified printing condition is displayed as the default condition, and when the page arranging mode has not been established in the page-arranging function setting screen, the register-mark printing function setting screen is displayed in such a state that an operation for selecting the printing condition of the register mark is disabled, or when the page arranging mode has been established in the page-arranging function setting screen, the print processing is automatically implemented, based on the above-specified printing condition of the register mark.

While the preferred embodiments of the present invention have been described using specific term, such description is for illustrative purpose only, and it is to be understood that changes and variations may be made without departing from the spirit and scope of the appended claims.

What is claimed is:

1. A non-transitory computer readable storage medium storing a computer executable program for implementing a print processing in an image forming apparatus that is provided with a page arranging function for arranging a plurality of page images onto a single paper sheet and a register mark printing function for printing a register mark, which serves as a positional reference for applying a cut processing, a fold processing or a bind processing to the paper sheet, the program being executable by a computer to cause the computer to perform a process comprising:

displaying a page-arranging function setting screen from which a page arranging mode from among a plurality of page arranging modes is settable via an operation of the page-arranging function setting screen, and a register-mark printing function setting screen from which a kind of the register mark from among a plurality of kinds of register marks and a printing condition of the register mark from among a plurality of printing conditions are settable;

storing a table in which the respective page arranging modes and corresponding printing conditions of the register mark from among the plurality of printing conditions are correlated with each other; and specifying the printing condition of the register mark, which corresponds to a set one of the page arranging modes, with reference to the table, so as to display the specified printing condition of the register mark corresponding to the set page arranging mode on the register-mark printing function setting screen as a default printing condition selected in advance.

2. The computer readable storage medium of claim 1, wherein, when the page arranging mode has not been set in the page-arranging function setting screen, the register-mark printing function setting screen is displayed in such a state that an operation for selecting the printing condition of the register mark is disabled.

3. The computer readable storage medium of claim 1, wherein, when the page arranging mode has been set in the page-arranging function setting screen, the print processing is implemented, based on the default printing condition selected in advance.

4. The computer readable storage medium of claim 1, wherein the plurality of printing conditions of the register mark include a condition in which the register mark is printed for every paper sheet and a condition in which the register mark is printed for every page image.

5. An image forming apparatus that is provided with a page arranging function for arranging a plurality of page images onto a single paper sheet and a register mark printing function for printing a register mark, which serves as a positional reference for applying a cut processing, a fold processing or a bind processing to the paper sheet, the image forming apparatus comprising:
   a display section that is adapted to display a page-arranging function setting screen from which a page arranging mode from among a plurality of page arranging modes is settable via an operation of the page-arranging function setting screen, and a register-mark printing function setting screen from which a kind of the register mark from among a plurality of kinds of register marks and a printing condition of the register mark from among a plurality of printing conditions are settable;
   a storage section that is adapted to store a table in which the respective page arranging modes and corresponding printing conditions of the register mark from among the plurality of printing conditions are correlated with each other; and
   a setting control section that is adapted to specify the printing condition of the register mark, which corresponds to a set one of the page arranging modes, with reference to the table stored in the storage section, so as to display the specified printing condition of the register mark corresponding to the set page arranging mode on the register-mark printing function setting screen as a default printing condition selected in advance.

6. The image forming apparatus of claim 5, wherein, when the page arranging mode has not been set in the page-arranging function setting screen, the setting control section displays the register-mark printing function setting screen in such a state that an operation for selecting the printing condition of the register mark is disabled.

7. The image forming apparatus of claim 5, wherein, when the page arranging mode has been set in the page-arranging function setting screen, the setting control section implements a print processing based on the default printing condition selected in advance.

8. The image forming apparatus of claim 5, wherein the plurality of printing conditions of the register mark include a condition in which the register mark is printed for every paper sheet and a condition in which the register mark is printed for every page image.

9. A method for controlling a register-mark printing operation to be implemented in an image forming apparatus that is provided with a page arranging function for arranging a plurality of page images onto a single paper sheet and a register mark printing function for printing a register mark, which serves as a positional reference for applying a cut processing, a fold processing or a bind processing to the paper sheet, the register-mark printing control method comprising:
   displaying a page-arranging function setting screen from which a page arranging mode from among a plurality of page arranging modes is settable via an operation of the page-arranging function setting screen, and a register-mark printing function setting screen from which a kind of the register mark from among a plurality of kinds of register marks and a printing condition of the register mark from among a plurality of printing conditions are settable;
   storing a table in which the respective page arranging modes and corresponding printing conditions of the register mark from among the plurality of printing conditions are correlated with each other; and
   specifying the printing condition of the register mark, which corresponds to a set one of the page arranging modes, with reference to the table, so as to display the specified printing condition of the register mark corresponding to the set page arranging mode on the register-mark printing function setting screen as a default printing condition selected in advance.

10. The method of claim 9, wherein, when the page arranging mode has not been set in the page-arranging function setting screen, the register-mark printing function setting screen is displayed in such a state that an operation for selecting the printing condition of the register mark is disabled.

11. The method of claim 9, wherein, when the page arranging mode has been set in the page-arranging function setting screen, the print processing is implemented, based on the default printing condition selected in advance.

12. The method of claim 9, wherein the plurality of printing conditions of the register mark include a condition in which the register mark is printed for every paper sheet and a condition in which the register mark is printed for every page image.

* * * * *